(No Model.)
G. J. JOHNSON.
SEWER PIPE CAP.
No. 443,680. Patented Dec. 30, 1890.
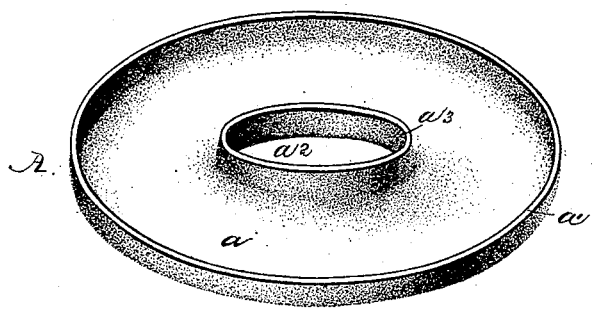
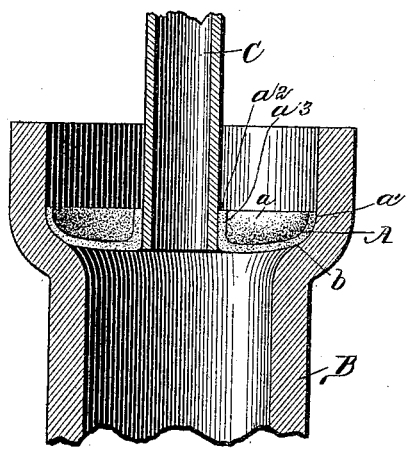
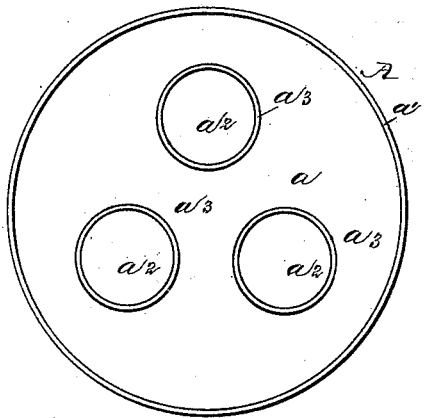
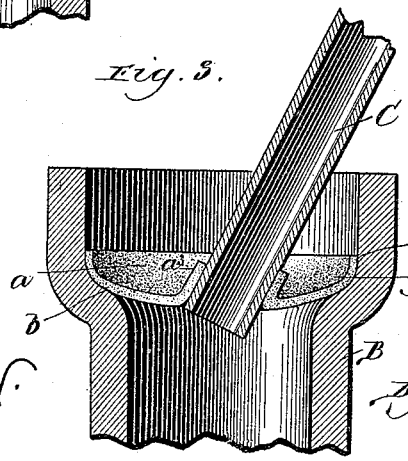
Witnesses
Inventor
Gustavus J. Johnson
By Chas. G. Page
Atty.

UNITED STATES PATENT OFFICE.

GUSTAVUS J. JOHNSON, OF CHICAGO, ILLINOIS.

SEWER-PIPE CAP.

SPECIFICATION forming part of Letters Patent No. 443,680, dated December 30, 1890.

Application filed July 1, 1890. Serial No. 357,364. (No model.)

*To all whom it may concern:*

Be it known that I, GUSTAVUS J. JOHNSON, a citizen of the United States, residing at Chicago, in the county of Cook and State of Illinois, have invented a certain new and useful Improvement in Sewer-Pipe Caps, of which the following is a specification.

My invention relates to means adapted for establishing a hermetically-sealed connection between the waste or soil pipes and the drain or sewer pipes for buildings, and involving a cap or cover, which is applied to the drain or sewer pipe, and formed so that one or more waste or soil pipes can be connected with it at their discharge ends. Prior to my invention these caps have been made of cast-iron, and hence it has been necessary not only to make them of various forms and sizes with reference to the form, size, and arrangement of pipes to be connected, but also to so cast each cap with relation to its destined situation as to leave between the pipes and cap a space to be filled with cement or some metallic packing as a means for holding the cap in place and forming a tight joint between the cap and pipes.

The more prominent objects of my invention are to provide a cap involving the inherent qualification of adjustability or adaptability to the form, size, and relative positions of the pipes; to avoid breakage in the joint should one or more of the pipes become bent or be allowed to sag, owing to a settling on the part of the building; to permit a cap adapted for connecting two pipes in line with one another to be used for connecting two pipes, whereof one is inclined with relation to the other; to utilize a portion of the cap itself as a means for forming a close and efficient packing-joint, and to provide a simple and economical construction of cap conformable to various forms and arrangements of connections between waste or soil pipes and drain or sewer pipes.

Further objects involved and advantages attained are hereinafter set forth.

In carrying out my invention I provide a flanged pliable metallic cap adapted for application to a drain or sewer pipe, and provided with one or more sockets for the reception of one or more soil or waste pipes. As a preferred pliable material, I form the cap of lead, although I can employ various metallic compositions having substantially the pliability of lead. The body of the cap thus characterized by my invention is provided with a marginal flange, and is further provided with one or more sockets or apertures, each surrounded by a neck or annular flange. In applying this cap to the usually enlarged end of a drain or sewer pipe it can be set within the same with its marginal flange uppermost, and, owing to the pliability of its said flange, the same can be so hammered or pressed as to conform to and closely fit against the inner wall of the pipe. In like way, after a drain or waste pipe has been received within a socket or flanged opening in the cap the pliable neck or flange thereof can be forced by hammering, or otherwise suitably-applied pressure, against the drain or waste-pipe, so as to closely fit about the same. The cap thus arranged forms a shallow, upturned, cup-shaped seat adapted to receive any desired cement or filling which can be used in quantity sufficient to cover over the highest points of its flanges, it being observed that while the pliable flanges when pressed against the pipes serve to form close joints, the presence of some sort of cement or filling within the upper end of the drain or sewer pipe is desirable, so as to insure a hermetic joint. Should the waste or soil pipe be inclined relatively to the drain or sewer pipe, the neck or flange about the opening in the cap can be readily bent to conform to the inclination of the inclined waste or soil pipe, and as a further feature incident to my improved cap formed of some soft, pliable, metallic composition or metal, such as lead, the cap can for certain purposes be readily divided by a saw or other suitable cutter into two or more sections, which can be subsequently reunited by soldering, so as to again form a complete cap. Thus, where the drain or sewer pipe has been laid and the house, soil, or waste pipe has been put into a building with its discharge-end extending into the drain or sewer pipe, the workman whose duty it is to form a hermetic joint between the two can readily cut the soft cap into two or more sections, apply the same, and then solder them together to form a complete cap.

In the accompanying drawings, Figure 1 represents in perspective a sewer-cap embodying my invention. Fig. 2 is a vertical central section through the cap as applied to a drain or sewer pipe and connected with a soil or waste pipe. Fig. 3 is a view similar to Fig. 2, but illustrates the soil or waste pipe inclined relatively to the drain or sewer pipe. Fig. 4 is a top plan view of a modification.

The cap A, illustrated in the first two figures, is formed with a disk-shaped body portion $a$, having a marginal flange $a'$ and a centrally-arranged opening $a^2$, surrounded by a neck or annular flange $a^3$, adapted to provide a socket for the discharge end of the soil or waste pipe. The cap shown in Fig. 4 is of like construction, with the exception that it is provided with several openings $a^2$, each surrounded by a neck or annular flange $a^3$, in order that it may serve as a connection between the drain or sewer pipe and a plurality of soil or waste pipes, it being understood that, where desired, the cap can be provided with any desired number of these sockets, whereby several pipes can be connected with the drain or sewer pipe.

In applying the cap for the purpose of thus connecting one or more soil or waste pipes with a drain or sewer pipe the cap can be placed within an enlarged open end of the drain or sewer pipe B, and seated upon the annular shoulder $b$, which is usually formed at a short distance back from the end of the pipe as a result of the enlargement of a portion of the bore thereof. The cap is thus placed within the pipe B with its flange $a'$ upturned or extending toward the adjacent end of the pipe, in which way its flange can then be forced outwardly and compacted against the inner wall of the pipe, as in Figs. 2 and 3. Should, therefore, the bore of the pipe be somewhat larger than the greatest diameter of the marginally-flanged cap, the diameter of the latter can be readily increased in conformity with the pipe-bore, and should any irregularity or departure from a true circle occur in the wall of the pipe-bore the cap can be easily adjusted to the same. After the discharge end of a soil or waste pipe C has been inserted within its allotted socket in the cap the neck or flange $a^3$, which practically forms such socket, can be forced and compacted against the pipe C, so as to form a close joint. In Fig. 2 the pipe C is shown in line with the bore of the pipe B, while in Fig. 3 the pipe C is shown inclined relatively to the bore of said pipe B. It will be understood, however, that the pliable metallic cap employed as a connection in the first-mentioned instance will also serve as a connection in the second-mentioned instance, for the reason that its pliable neck or flange $a^3$, which will yield to the inclination of the pipe C, can be easily bent and compacted against said pipe, as illustrated in Fig. 3. It will also be observed that notwithstanding the fact that the pipe C in said figure is inclined not only to the bore of the pipe B, but also to what may be termed the "general plane" of the cap, it can be so extended within or through the opening in the cap as to leave the full area of its discharge end open within the drain or sewer pipe, in which way a free and clear waterway is provided through the soil or waste pipe. Should the cap be made of hard metal, such as cast-iron, the soil or waste pipe could not as a matter of course be inclined relatively to the plane of the cap unless the cap involved a socket considerably larger than the soil or drain pipe; but in such case the space between the neck and soil or waste pipe would have to be filled with some sort of packing, and the discharge end of the drain or soil pipe could not be so extended into the neck as to open at the bottom of the cap, whereby in place of a clear open water-way there would be a water-way closed or contracted to an objectionable extent and obstructed by reason of the position of the discharge end of the soil or waste pipe within the neck of the cap. The pliability of the cap also serves to avoid breakage incident to the expansion and contraction of either the pipes or the cap itself, and, moreover, the joint will preserve its integrity notwithstanding any deflection or change of relative position on the part of the pipes due to settling of the building or other like causes. After the cap has been applied, as in Figs. 2 and 3, the space between the cap and the next adjacent end of pipe B can be filled with cement or any desired composition, so as to insure a hermetic seal.

While the cap can be made of various metallic compositions suitable for forming a comparatively soft and pliable article I prefer forming it of lead, and may either mold it or strike it up from sheet-lead of suitable thickness.

An important feature involved in a pliable soft-metal sewer-cap is that it can be readily cut into two or more sections which can be applied in instances where the application of a complete cap could not be made, and then soldered together, so as to again form a complete cap in its allotted position. These said instances are by no means of rare occurrence. Thus it frequently happens that one contractor lays the drain or sewer pipe, and another supplies the building with a soil or waste pipe leading into the drain or sewer pipe, while the work of hermetically connecting the two is left to the plumber. Under such conditions my soft-metal cap can be readily cut by the plumber into two or more sections, which can be placed within the sewer-pipe at a point about the soil or waste pipe and then reunited by soldering, so as to form a complete cap.

Although the cap may be bent in cutting it up, yet it can readily be bent back into shape, either while in sectional form or after its sections have been reunited by soldering, and while in either of said forms it can be bent to conform to the pipes, so as to form a close cap-joint between them.

What I claim as my invention is—

1. A pliable metallic sewer-pipe cap provided with one or more soil or waste pipe openings, and formed with a marginal flange which can be compacted against the drain or sewer pipe, substantially as and for the purpose set forth.

2. A pliable metallic sewer-pipe cap provided with one or more soil or waste pipe openings, each surrounded by a neck or flange which can be compressed around and compacted against the soil or waste pipe allotted thereto, substantially as and for the purpose set forth.

3. A pliable metallic sewer-pipe cap formed with a marginal flange which can be compacted against the drain or sewer pipe, and having one or more soil or waste pipe openings, each surrounded by a neck or flange which can be compressed around and compacted against the soil or waste pipe allotted thereto, substantially as set forth.

4. A pliable sheet-lead sewer-pipe cap having one or more openings for one or more soil or waste pipes arranged to extend into the drain or sewer pipe, a marginal flange which can be compacted against the drain or sewer pipe, and a flange or flanges which can be compacted against the soil pipe or pipes, whereby said cap can be cut in sections which can be applied between said pipes and reunited by soldering to form a completed pliable cap, which can be bent to conform to the pipes either while in sectional form or after the sections have been reunited, substantially as set forth.

GUSTAVUS J. JOHNSON.

Witnesses:
   CHAS. G. PAGE,
   HARRY COBB KENNEDY.